United States Patent
Ku

(10) Patent No.: US 7,183,924 B1
(45) Date of Patent: Feb. 27, 2007

(54) STORING CONFIGURATION INFORMATION AND A SERVICE RECORD FOR AN ITEM IN AN RFID TAG

(75) Inventor: Joseph Ku, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/249,544

(22) Filed: Oct. 13, 2005

(51) Int. Cl.
*G08B 13/14* (2006.01)

(52) U.S. Cl. ............... 340/572.1; 340/571; 340/568.1; 400/76

(58) Field of Classification Search ............. 340/572.1, 340/572.4, 571, 570, 568.1, 568.5, 568.8, 340/10.1, 10.3, 568.7; 400/76, 70; 235/375; 705/1
See application file for complete search history.

(56) References Cited

U.S. PATENT DOCUMENTS

| | | | |
|---|---|---|---|
| 5,629,981 A * | 5/1997 | Nerlikar .................... | 713/168 |
| 6,164,551 A | 12/2000 | Altwasser | |
| 6,320,509 B1 * | 11/2001 | Brady et al. ............. | 340/572.7 |
| 6,459,588 B1 | 10/2002 | Morizumi et al. | |
| 6,724,308 B2 * | 4/2004 | Nicholson ................ | 340/572.1 |
| 6,802,659 B2 * | 10/2004 | Cremon et al. ............... | 400/76 |
| 6,861,993 B2 | 3/2005 | Waldner | |
| 6,965,866 B2 * | 11/2005 | Klein .......................... | 705/1 |
| 7,032,818 B2 * | 4/2006 | Thomas et al. ............. | 235/381 |
| 7,040,532 B1 * | 5/2006 | Taylor et al. ................ | 235/375 |

OTHER PUBLICATIONS

Eberle, H., "Radioport: A Radio Network for Monitoring and Diagnosing Computer Systems", SMLI TR-2002-117, Oct. 2002.
Smith, D., "What Do You Know About Capacitive Voltage Sensors?", EC&M, Aug. 1, 2005, http://ecmweb.com/mag/electric_know_capacitive_voltage/index.html.
New Serial Presence Detect (SPD) EEPROM from STMicroelectronics Fully Supports JEDEC DDR2 Standard, May 27, 2004.http://www.st.com/stonline/press/news/year2004/p1461m.htm.
"Understanding DDR Serial Presence Detect (SPD) Table" Jul. 14, 2003, http://www.simmtester.com/page/news/showpubnews.asp?num=101.

* cited by examiner

*Primary Examiner*—Van T. Trieu

(57) ABSTRACT

A system includes a reader operable to read information from an RFID tag. The information includes a configuration of an item. A computer system is connected to the reader. The computer system is operable to store the information read from the RFID tag. The computer system is also operable to create a record of service performed on the item, and write the record to the RFID tag using the reader.

19 Claims, 3 Drawing Sheets

STORING CONFIGURATION INFORMATION AND A SERVICE RECORD FOR AN ITEM IN AN RFID TAG

BACKGROUND

Radio frequency identification device (RFID) systems are widely used for tracking and other applications in many different types of industries. A typical RFID system includes RFID tags and an RFID reader that reads information from the RFID tags. For example, the RFID reader includes a transmitter that outputs radio frequency (RF) signals through an antenna to create an electromagnetic field that enables the tags to return an RF signal carrying the information stored in the tag, which is received by the reader. Some types of conventional tags are "passive" tags, such as tags without an internal power source that may be energized by the electromagnetic field generated by the reader, and "active tags", such as tags with an internal power source.

Many RFID systems use tags to track goods. For example, a tag is attached to a palette of goods. The palette of goods is tracked using readers at various points in the supply chain. These type of RFID tracking systems are still evolving, and the potential of this technology is still yet to be explored. One of these areas is the post sale service of sophisticated machinery which includes automobiles and computer systems, especially in large data centers. Managing a data center with minimum down time is major challenge for IT support personnel. For the system manufacturers, providing efficient post sale service, maintaining service records and preventing fraud are also major challenges. For example, it may be critical for call center front and back line support personnel to have all the pertinent information of the system integrated together and readily available to improve the efficiency of the service. This information may include service contract, system configurations, service and repair records, major component list, spare part list, etc. There are various ways to accomplish this task by the devices available in the current market place, however, none of them achieves what is desirable in the service industry. For example, databases are typically kept by a product manufacturer that may include information about systems that is helpful to support personnel. However, these databases are typically not updated by third-parties that may perform service on systems after manufacturing. Thus, when a user calls the manufacturer's call center for service, the call center personnel may not know the current configuration of the system and may not be able to properly advise the user. Furthermore, even if the user were to return the system to the manufacturer for repair, the manufacturer may know if the configuration of the system has been modified, which may invalidate the warranty, or whether the system being returned is a system under an existing service contract.

BRIEF DESCRIPTION OF THE DRAWINGS

Embodiments are illustrated by way of example and not limitation in the accompanying figures in which like numeral references refer to like elements, and wherein.

DETAILED DESCRIPTION

Figure 1:
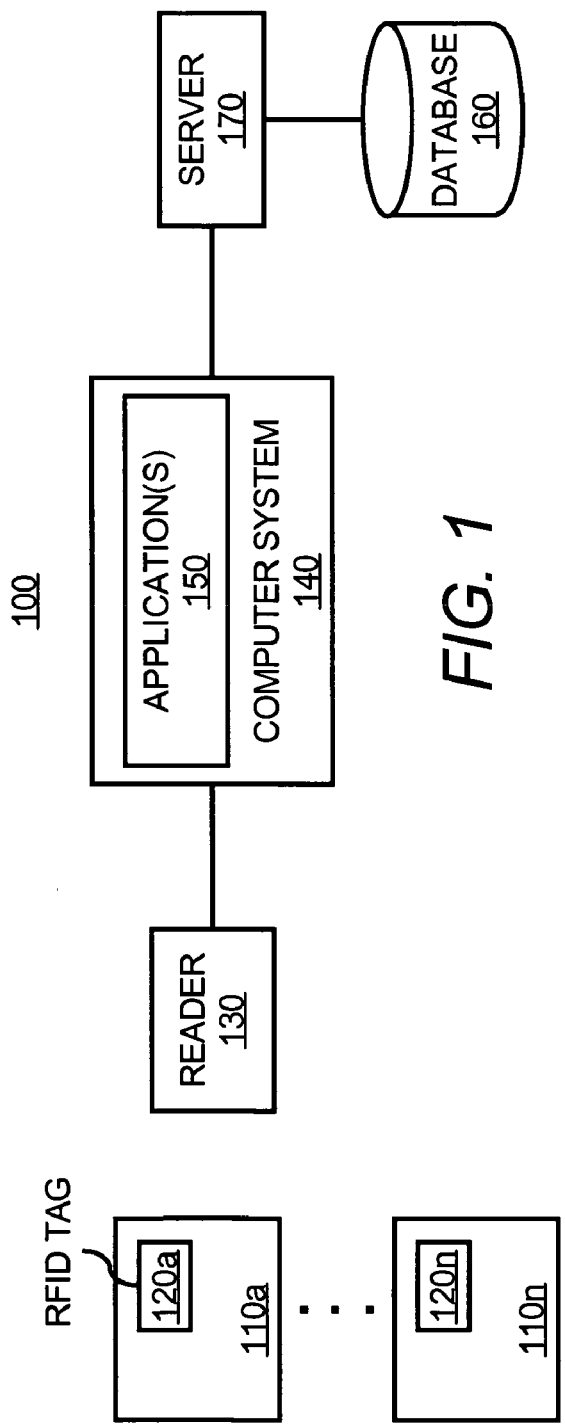
FIG. 1 shows a block diagram of a system, according to an embodiment.

For simplicity and illustrative purposes, the principles of the embodiments are described. However, one of ordinary skill in the art would readily recognize that the same principles are equally applicable to, and can be implemented with, variations that do not depart from the true spirit and scope of the embodiments. Moreover, in the following detailed description, references are made to the accompanying figures, which illustrate specific embodiments.

According to an embodiment, an RFID tag stores the configuration of an item and other information about an item. An item may include a manufactured good, such as a good offered for sale, or other tangible item. One type of item is sophisticated machinery, such as computer systems, automobiles, jet engines, military vehicles and any other type of vehicle. The embodiments described herein are applicable to other types of items as well. The configuration of an item may include information related to the specifications of the item. For example, with respect to an item comprised of a computer system, the hardware and software configuration of the computer system is stored in an RFID tag attached to the computer system Attaching the RFID tag may include attaching the RFID tag to the item itself or attaching the RFID to the packaging for the item. However, preferably the RFID tag is attached to the item itself so information stored in the RFID tag always resides with the item. Other information may also be stored in the tag, such as warranty information, service contract information, list of major components, supplier's information, date of manufacture, spare parts list, and other information about the item. The configuration and other information for the item may be stored prior to a first time the item is delivered to a user. For example, the manufacturer may store this information in the RFID tag for the item.

Also, according to an embodiment, if service is performed on the item after manufacturing, the RFID tag is updated to include service records, such as information about the services. This may include, but is not limited to, the parts that were serviced, data and time of service, service provider's information, and other information. Thus, the original information stored in the RFID tag, such as the configuration of the item and possibly other information, as well as service records stay with the item because the RFID tag storing the information is attached to the item.

As described above, the RFID tag may store configuration, service records and other information. The RFID tag may be updated with information at various points in the manufacturing lines and delivery channel. The RFID tag may be updated with service records, such as repair and upgrades. The RFID memory may be non-volatile and the stored information is easily retrievable using a low-cost, conventional reader. The stored information can be synchronized with a database. The RFID tag is local to the item, such as attached to the item. The RFID tag may be tamper-resistant. For example, the stored information can be encrypted/decrypted depending on the security level. Also, the RFID tag may be provided on the inside of a housing of the item or on another location of the item that is not readily accessible by a user. Also, the RFID tag is independently powered from the item and can be powered-up on demand. These features may be desirable by IT personnel responsible for managing and servicing the items.

FIG. 1 illustrates a block diagram of a system 100, according to an embodiment. The system 100 includes items 110a . . . n with an RFID tag 120a . . . n on the items 110*a* . . . *n* and storing information about the items 110*a* . . . *n*. The system 100 also includes a reader 130 connected to a computer system 140.

The RFID tags 120*a* . . . *n*, for example, store the configuration of the items 110*a* . . . *n*. Other examples of information that may be stored in the RFID tags 120*a* . . . *n* include warranty information, service contract information, list of major components, supplier's information, date of manufacture and warranty term, spare parts list, and other information about the item. Some or all of this information may be stored in an RFID tag before or after the item is delivered to the customer. The RFID tags 120*a* . . . *n* are local to the item 110. For example, the RFID tags 120*a* . . . *n* are attached to respective items 110*a* . . . *n*.

The reader 130 is operable to read the information stored in the RFID tags 120*a* . . . *n*. The reader 130 may be connected to the computer system 140 for storing the information read from the RFID tags 120*a* . . . *n*. The computer system 140 may run one or more applications 150. The applications 150, for example, may be for tracking maintenance, warranty and service information for items and for creating service records and for writing information, such as service records, to the RFID tags 120*a* . . . *n*. Also, the computer system 140 may decrypt the information read from the RFID tags 120*a* . . . *n* if it is encrypted and may encrypt information written to the RFID tags 120*a* . . . *n*.

In one example, the computer system 140 is connected to another computer system, such as the server 170. For example, the computer system 140 is a personal digital assistance (PDA), or some other mobile computer system that is carried with the reader 130 to read information from the RFID tags 120*a* . . . *n*. The computer system 140 connects to the server 170 to store information read from the RFID tags 120*a* . . . *n*. The server 170 may also store service records and other information about the terms 110*a* . . . *n*. In one embodiment, a database 160 is used to store the information for the items 110*a* . . . *n*. In one example, the items 110*a* . . . *n* are computer systems in a data center. The server s170 stores the information read from the RFID tags 120*a* . . . *n* and the information written to the tags 120*a* . . . *n*. This information is used for inventory and maintaining the computer systems in the data center.

The information read from the RFID tags 120*a* . . . *n* and the service records may be stored and used with inventory software. The service records may include information for authorized services and not services that, if performed, may void the warranty. Also, the information read from the RFID tags 120*a* . . . *n*, including service records, may be used to determine whether a warranty for the item is void or whether the item is included in an existing service contract based on the information read from the RFID tag. The information read from the RFID tags 120*a* . . . *n* may also be used for other applications.

According to an embodiment, the RFID tag 120 is operable to be written to, for example, using the reader 130. For example, the item 130 is serviced. The reader 130 writes a service record to the RFID tag 120, which may include the date and time of service, service provider information, and a description of the service performed on the item. Thus, the service records for the item 130 stay with the item 130. This is beneficial for a subsequent service provider that may need the service records to diagnose and fix a subsequent problem. The RFID tag 120 may also store the original configuration of the item 130 and thus a manufacturer may determine if a warranty is voided, for example, due to unauthorized modifications. In another embodiment, the RFID tag 120 includes write-once memory, and the configuration and other information may be stored in the RFID tag 120 one time, such as before shipping the item 130 to the customer.

The system 100 shown in FIG. 1 may include a single computer system, such as the computer system 140 and may not include the server 170. Also, the reader 130 may be in an environment where a single item is being serviced or managed at a time, such as described with respect to FIG. 3.

Figure 2:
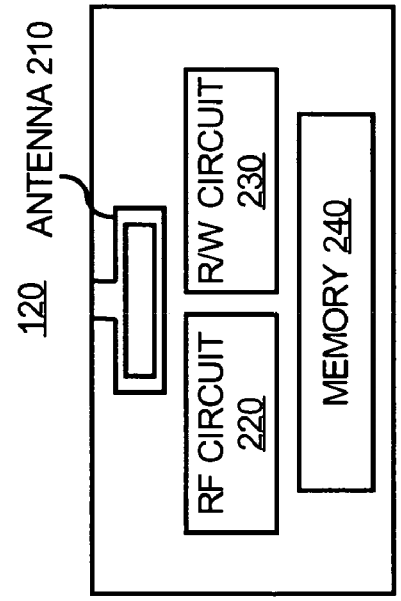
FIG. 2 shows a block diagram of an RFID architecture that may be used in the system shown in FIG. 1.

FIG. 2 illustrates an architecture of the RFID tag 120, according to an embodiment. The RFID tag 120 may include an antenna 210, an RF circuit 220, a read/write (R/W) circuit 230, and a memory 240. The RFID tag 120 may include a conventional RFID tag 120 that is "passive", "active" or "semi-passive". The components shown in FIG. 2 are examples of some components that may be included in the RFID tag 120. One or more of the components shown in FIG. 2 may not be used and/or other components may be included in the RFID tag 120.

The antenna 210 may be an inductive loop antenna or a dipole antenna. In one embodiment, the RFID tag 120 may not include an antenna. For example, the RFID tag 120 may be connected to an external antenna, which allows the RFID tag 120 to have a smaller size. U.S. Patent Application, entitled, "Printed Circuit Board With Antenna" by Ku et al. and assigned to the same assignee is incorporated by reference in its entirety and discloses an embodiment of an RFID tag that uses an external antenna in a printed circuit that may be used in an embodiment herein.

The RF circuit 220 is a circuit for demodulating received information and modulating information transmitted from the RFID tag 120. The R/W circuit 230 controls the reading from the memory 240 and the writing to the memory 240. The memory 240 may be a write-once memory or may be a re-writable memory, such as a flash memory.

Figure 3:
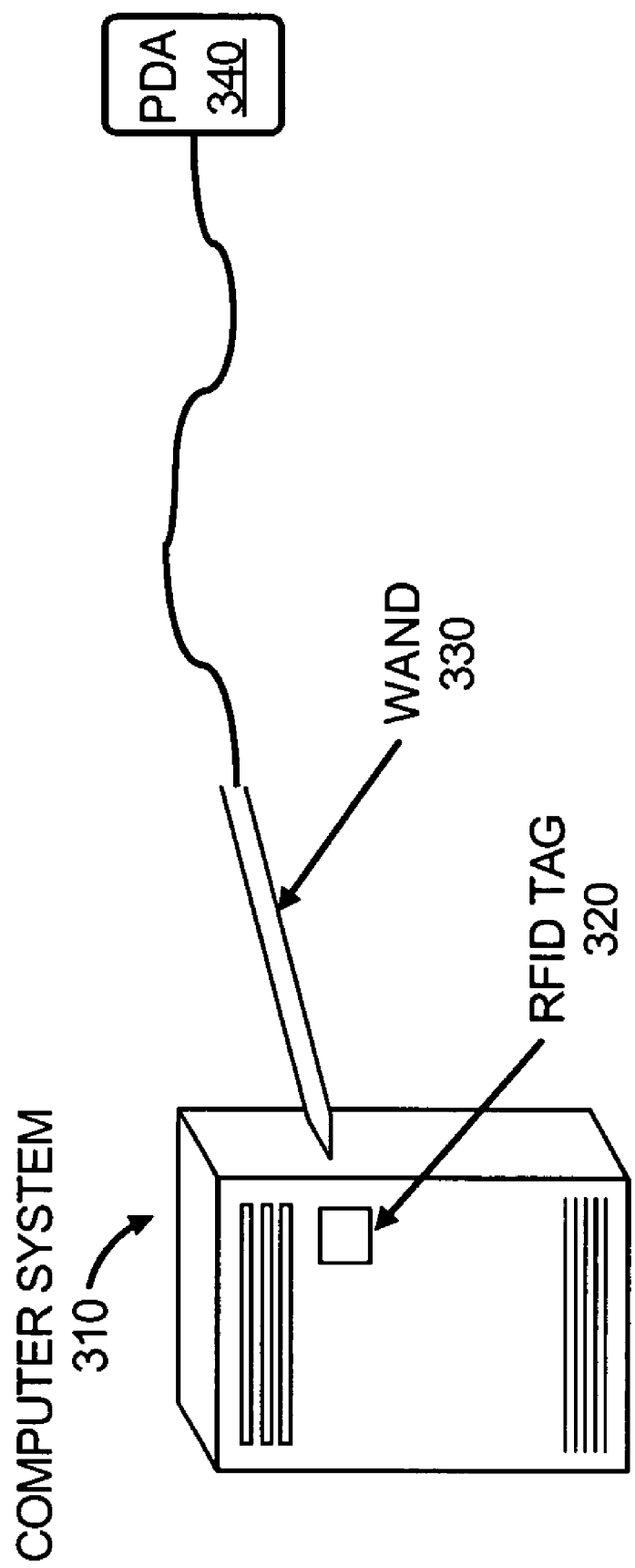
FIG. 3 shows an example of a system, according to an embodiment.

FIG. 3 illustrates an example of the system 100 shown in FIG. 1. In this example, the item comprises a computer system 310 with the RFID tag 120. The reader comprises a wand 330 connected to a computer system, such as the personal digital assistant 340. Other types of computer systems that may be used include a laptop, server, and other types of computer systems known in the art. Also, other types of readers may be used as is known in the art.

In the example shown in FIG. 2, the RFID tag 120 stores factory-loaded information initially, such as hardware/software system configuration, e.g., processor types, amount of memory, hard drive size, software loaded on the computer system, and the like, service warranty contract, major components, supplier's info, date of manufacture and warranty term, spare list, and/or other information.

The computer system 310 is installed in a customer site. Service is needed, such as an upgrade, regular maintenance, or repair. A service technician uses the wand reader 330 to retrieve the system information from the RFID tag 120, and the service technician may use the information to perform the desired service on the computer system 310. When the service is done, the service technician creates a record on the PDA 340 of the service performed on the computer system 310. That record may be later transferred to another computer system, such as a server. That record is written to the RFID tag 120, so the record resides with the computer system 310.

Figure 4:
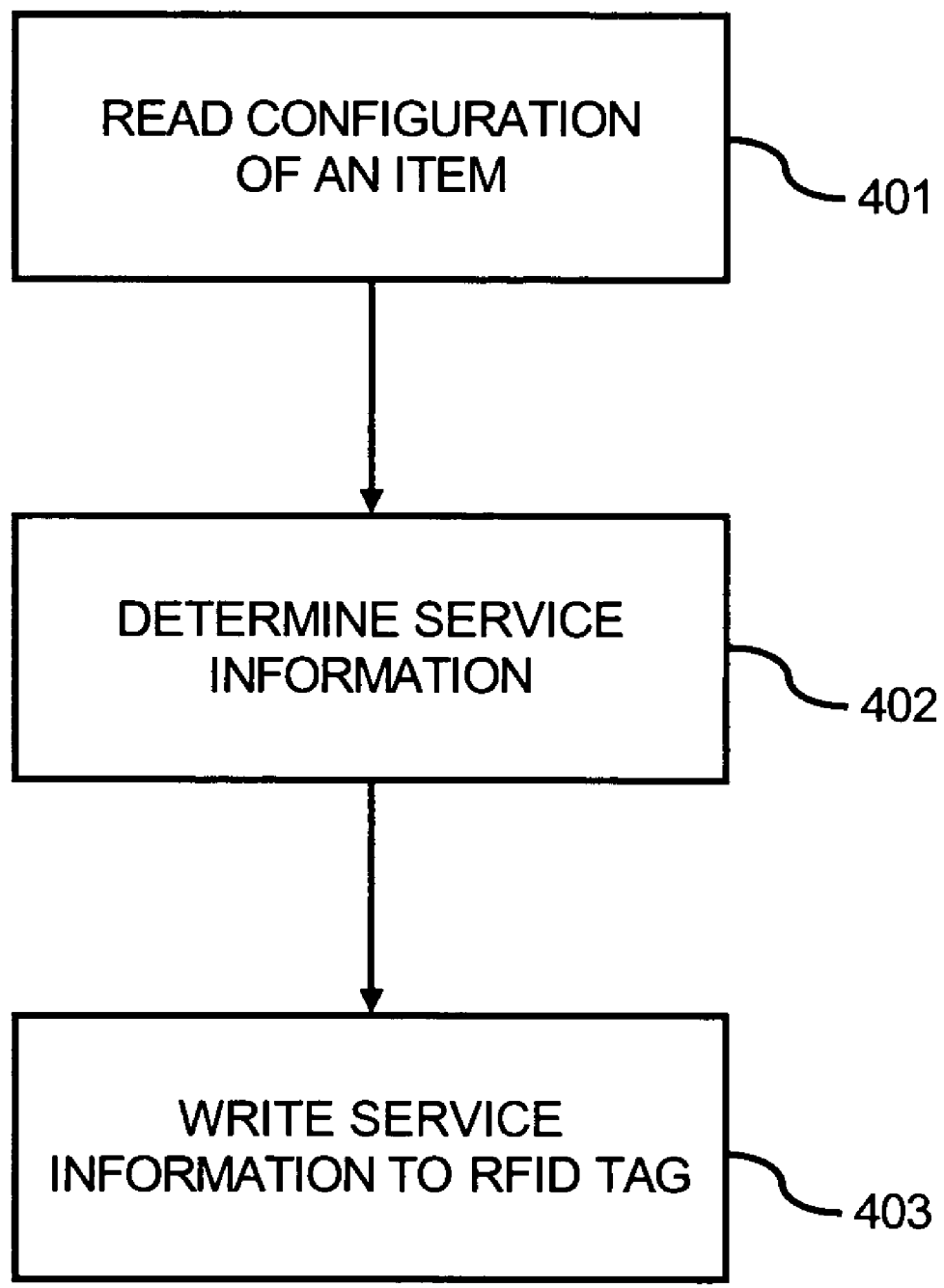
FIG. 4 shows a method, according to an embodiment.

FIG. 4 illustrates a flow chart of a method 400, according to an embodiment. The method 400 is described with respect to the FIGS. 1–3 by way of example and not limitation.

At step 401, the reader 130 shown in FIG. 1 reads the configuration of an item, such as the item 110*a*, from the RFID tag 120*a*. The configuration may be used to service the item 110a. Other information may also be stored in the RFID tag 120a and read from the RFID tag 120a. The other information, for example, includes one or more of warranty information, service contract information, list of major components, manufacturer's information, supplier's information, manufacture data, and spare parts list. Also, the information stored in the RFID tag 120a may be encrypted and the information read from the RFID tag 120a may be decrypted by the computer system 140.

At step 402, a service is performed on the item 110a and information about the service is determined. For example, the information includes date and time of service, service provider information, and a description of the service performed on the item. A service record is created including the information.

At step 403, the information, such as a service record, is written to the RFID tag 120a, for example, using the reader 130.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A system comprising:
a reader operable to read information from an RFID tag, wherein the information includes configuration of an item comprising at least hardware specifications for the item determined after manufacturing and prior to the first time the item is delivered to a user;
a computer system connected to the reader, the computer system being operable to store the information read from the RFID tag, wherein the information is operable to be used to service the hardware of the item, and the computer system being further operable to create a record of service performed on the hardware for the item, wherein the reader is operable to write the record to the RFID tag.

2. The system of claim 1, wherein the RFID tag is attached to the item.

3. The system of claim 1, wherein the RFID tag stores the configuration and other information associated with the item prior to a first time the item is delivered to a user.

4. The system of claim 1, wherein the other information comprises at least one of warranty information, service contract information, list of major components, manufacturer's information, supplier's information, manufacture date, and spare parts list.

5. The system of claim 1, wherein the record comprises at least one of date and time of service, service provider information, and a description of the service performed on the item.

6. The system of claim 1, wherein the item comprises a manufactured good to be offered for sale.

7. The system of claim 1, further comprising:
a plurality of items; and
an RFID tag attached to each item, wherein each item stores a configuration of a respective item.

8. The system of claim 7, wherein each RFID tag stores at least one service record for the respective item.

9. The system of claim 8, wherein the computer system is operable to store the configuration and the at least one service record read from each RFID tag using the reader.

10. The system of claim 9, wherein the plurality of items comprise computer systems in a data center, and the configuration and the at least one service record read from each RFID tag is used for inventory and maintaining the computer systems.

11. A method comprising:
reading configuration of an item from an RFID tag attached to the item, wherein the configuration of the item is determined after manufacturing and prior to a first time the item is delivered to a user; and the configuration and other information are stored in the RFID tag prior to the first time the item is delivered to a user;
determining information about a service performed on the item; and
writing the information about the service in the RFID tag attached to the item.

12. The method of claim 11, further comprising:
decrypting the configuration and other information read from the RFID tag.

13. The method of claim 11, wherein the other information comprises at least one of warranty information, service contract information, list of major components, manufacturer's information, supplier's information, manufacture date, and spare parts list.

14. The method of claim 11, further comprising:
reading information about the item from the RFID tag attached to the item; and
determining whether a warranty for the item is void based on the information read from the RFID tag.

15. The method of claim 1, further comprising:
reading information about the item from the RFID tag attached to the item; and
determining whether the item is included in an existing service contract based on the information read from the RFID tag.

16. The method of claim 11, further comprising:
reading information about the item from the RFID tag attached to the item; and
storing the information for use with an inventory software application.

17. The method of claim 11, further comprising:
storing a record for each authorized service performed on the item.

18. An apparatus comprising:
a reader means for reading information from an RFID tag, wherein the information includes configuration of an item configuration of an item comprising at least hardware specifications for the item determined after manufacturing and prior to the first time the item is delivered to a user and the RFID tag is attached to the item;
a computer system means for storing information read from the RFID tag, wherein the information is operable to be used to service the hardware of the item, and the computer system means is for creating a record of service performed on hardware for the item, wherein the reader means is operable to write the record to the RFID tag.

19. The apparatus of claim 18, further comprising:
a storage means for storing the configuration and the record of service read from the RFID tag and storing configurations and records of service read from a plurality of other RFID tags attached to a plurality of other items.

* * * * *

UNITED STATES PATENT AND TRADEMARK OFFICE
CERTIFICATE OF CORRECTION

PATENT NO. : 7,183,924 B1  Page 1 of 1
APPLICATION NO. : 11/249544
DATED : February 27, 2007
INVENTOR(S) : Joseph Ku It is certified that error appears in the above-identified patent and that said Letters Patent is hereby corrected as shown below:

In column 1, line 50, after "may" insert -- not --.

In column 3, line 30, delete "assistance" and insert -- assistant --, therefor.

In column 3, line 35, delete "terms" and insert -- items --, therefor.

In column 5, line 6, delete "data," and insert -- date, --, therefor.

In column 6, line 30, in Claim 14, delete "determining" and insert -- determine --, therefor.

In column 6, line 32, in Claim 15, delete "claim 1," and insert -- claim 11, --, therefor.

In column 6, line 49, in Claim 18, after "item" delete "configuration of an item".

Signed and Sealed this

Thirteenth Day of April, 2010

David J. Kappos
*Director of the United States Patent and Trademark Office*